G. A. EVANS.
Self-Creamer.
No. 214,762.  Patented April 29, 1879.
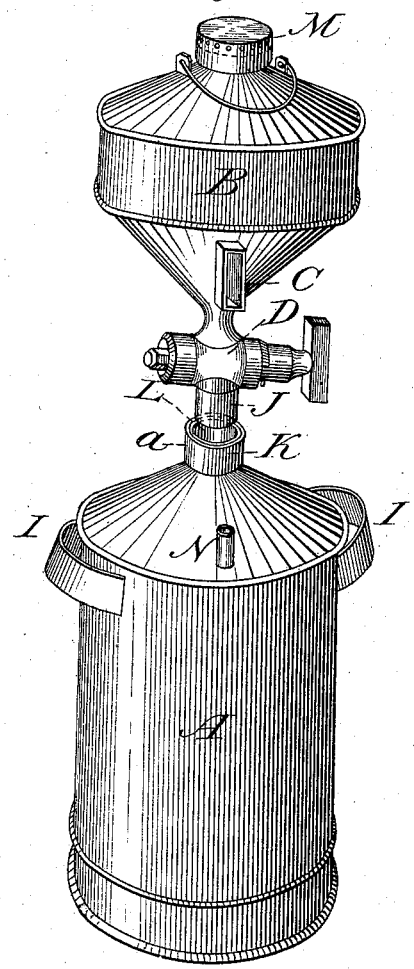
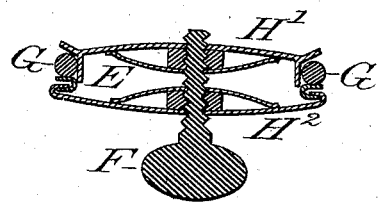

UNITED STATES PATENT OFFICE.

GEORGE A. EVANS, OF KINGSEY TOWNSHIP, DRUMMOND COUNTY, QUEBEC, CANADA.

IMPROVEMENT IN SELF-CREAMERS.

Specification forming part of Letters Patent No. 214,762, dated April 29, 1879; application filed September 19, 1878.

*To all whom it may concern:*

Be it known that I, GEORGE ABBOTT EVANS, of the township of Kingsey, in the county of Drummond, Province of Quebec, in the Dominion of Canada, have invented certain new and useful Improvements in Self-Creamers, which improvements are fully set forth in the following specification, reference being had to the accompanying drawings.

The object of my invention is to provide a convenient and effective means whereby milk may be kept cool, well ventilated, and in good condition, and also whereby the cream may be easily and thoroughly separated from the thin portion of the milk.

My invention consists in the arrangement of all the parts of the milk-vessel, hereinafter described, and which is fully shown in the accompanying drawings, in which—

Figure 1 is a perspective view. Fig. 2 is a cross-section of the movable bottom.

The part represented by the letter A is the lower part of the vessel, which contains the thin portion of the milk. Its top part is constructed so as to form a small neck or socket, K, into which the tube J of the upper part or cream-holder B fits tightly when the vessel is in use. In the tube J is a faucet, D, the object of which will be shown in the following directions for using the vessel.

The lower vessel, A, is provided with a movable bottom, E, which may be secured at any desired height in the vessel A. The object of having it thus movable is to insure that the fluid in the vessel shall always (whether the quantity be large or small) reach well up into the upper or cream vessel, B. For instance, if there should be enough milk to fill the vessel, the bottom E must be placed as near the lower edge as possible in the vessel A, and should the quantity be small the bottom is adjusted higher up. The cream particles being lighter than the rest of the milk will always rise as high as possible in the milk, and by tapering the top of lower vessel, A, the cream particles in rising move toward the neck or socket K, through which they then rise into the cream-holder B. When it is desirable to remove the cream-holder from the milk-vessel, the faucet D should be closed.

In the lower part of the cream-holder I have placed a small window, C, through which the contents of the cream-holder may be seen, and should there be found any thin milk underlying the cream it may be run out by simply opening the faucet D. The cream-holder may be provided with legs (although not shown in the drawings) extending below the tube J, so that it may be set down and retain an upright position. The top opening in the cream-holder, through which the vessel is filled, is provided with cap M, in which there are a number of small holes for the purpose of ventilating.

Tube J and socket K are of ground metal, and when joined together form a perfectly tight joint.

N is small air-vent, by which the air is allowed to escape when the can A is being filled, and can be tightly closed with a stopper or cork.

The movable bottom E is composed of the top plate, $H^1$, and bottom plate, $H^2$, which are held together by the thumb-screw F and a rubber ring, G, which runs round the rims of the top and bottom plates; and when the plates $H^1$ and $H^2$ are tightened together by thumb-screw F, the pressure causes the rubber ring to project until it presses against the inside of the vessel, so as to form a perfectly tight bottom wherever it is placed in the vessel.

In using this vessel the tube J of the cream-holder is inserted into the socket K and pressed in so that the joint will be tight. The faucet D is then opened and the stopper taken out of air-vent N. The milk is then poured in at the top of the cream-holder B until it reaches the air-vent, when the stopper is put in, so as to prevent leakage at this joint. The milk is then again poured in until it reaches well up in cream-holder B, about as much as would equal the quantity of cream to be extracted. The vessel is then immersed in water at a temperature of between 45° and 50° and allowed to stand about four hours, when the whole of the cream will have ascended through the neck and tube into cream-holder B. The cream-holder with its contents may then be removed from the milk-vessel A by simply drawing the tube J out of socket or neck K and closing faucet D, after which it may be disposed of as desired. When the milk-vessel is to be cleaned internally, the movable bottom can be removed altogether.

I claim as my invention—

1. The combination of the milk-vessel A with the cream-holder B, substantially as shown and described.

2. The combination of the tube J, faucet D, window C, and perforated cap M with the cream-holder B, as and for the purpose set forth.

3. The combination of the vessel A, movable bottom E, cream-holder B, and faucet D, as and for the purpose set forth.

G. A. EVANS.

Witnesses:
  GEO. H. GOWEN,
  JOHN C. EVANS.